(12) United States Patent
Fukui et al.

(10) Patent No.: US 10,766,348 B2
(45) Date of Patent: Sep. 8, 2020

(54) VEHICLE REAR STRUCTURE

(71) Applicant: TOYOTA JIDOSHA KABUSHIKI KAISHA, Toyota-shi (JP)

(72) Inventors: Ryosuke Fukui, Toyota (JP); Masahiro Tsuchida, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/295,269

(22) Filed: Mar. 7, 2019

(65) Prior Publication Data

US 2019/0275876 A1   Sep. 12, 2019

(30) Foreign Application Priority Data

Mar. 9, 2018 (JP) ................. 2018-042752

(51) Int. Cl.
| | | |
|---|---|---|
| *B62D 21/02* | (2006.01) | |
| *B60K 1/04* | (2019.01) | |
| *B62D 21/09* | (2006.01) | |
| *B62D 21/15* | (2006.01) | |
| *B62D 25/20* | (2006.01) | |

(52) U.S. Cl.
CPC ............... *B60K 1/04* (2013.01); *B62D 21/02* (2013.01); *B62D 21/09* (2013.01); *B62D 21/155* (2013.01); *B62D 25/2027* (2013.01); *B60K 2001/0416* (2013.01); *B60K 2001/0438* (2013.01); *B60Y 2200/91* (2013.01); *B60Y 2200/92* (2013.01); *B60Y 2306/01* (2013.01)

(58) Field of Classification Search
CPC ............ B60L 50/64; B60K 2001/0438; B60K 2001/0472

USPC ........................................................ 180/68.5
See application file for complete search history.

(56) References Cited

U.S. PATENT DOCUMENTS

| | | | | | |
|---|---|---|---|---|---|
| 5,364,128 | A | * | 11/1994 | Ide ........................... | B60G 7/02 280/781 |
| 6,109,654 | A | * | 8/2000 | Yamamoto ........... | B62D 21/152 180/299 |
| 6,227,322 | B1 | * | 5/2001 | Nishikawa .............. | B60R 16/04 180/65.1 |
| 6,994,178 | B2 | * | 2/2006 | Mizuno .................... | B60K 1/04 429/430 |
| 7,066,531 | B2 | * | 6/2006 | Tomita .................. | B62D 21/152 180/68.5 |
| 7,070,015 | B2 | * | 7/2006 | Mathews ................. | B60K 1/04 180/68.5 |
| 7,144,039 | B2 | * | 12/2006 | Kawasaki ................ | B60K 1/04 280/784 |

(Continued)

FOREIGN PATENT DOCUMENTS

JP 2011-121483 6/2011

*Primary Examiner* — Jeffrey J Restifo
(74) *Attorney, Agent, or Firm* — Oblon, McClelland, Maier & Neustadt, L.L.P.

(57) ABSTRACT

A vehicle rear structure secures a battery pack to rear side members by suspension. Each rear side member includes a less-strengthened portion further rearward of a vehicle with respect to a coupling portion with a rear cross member. The coupling portion is a suspending portion configured to fasten the rear end of the battery pack by suspension. The less-strengthened portion causes the rear side member to deform by bending when a collision load F is applied from rearward of the vehicle to the rear side member.

9 Claims, 6 Drawing Sheets

(56) References Cited

U.S. PATENT DOCUMENTS

| | | | | |
|---|---|---|---|---|
| 7,407,192 | B2 * | 8/2008 | Yoshimura | B62D 21/155 280/124.109 |
| 7,610,978 | B2 * | 11/2009 | Takasaki | B60K 1/04 180/68.5 |
| 7,654,351 | B2 * | 2/2010 | Koike | B60K 1/04 180/68.5 |
| 7,717,207 | B2 * | 5/2010 | Watanabe | B60K 1/04 180/68.5 |
| 7,886,861 | B2 * | 2/2011 | Nozaki | B60K 1/00 180/232 |
| 8,037,960 | B2 * | 10/2011 | Kiya | B60K 1/04 180/68.5 |
| 8,051,934 | B2 * | 11/2011 | Kiya | B60K 1/04 180/68.5 |
| 8,079,435 | B2 * | 12/2011 | Takasaki | B60K 1/04 180/68.5 |
| 8,602,454 | B1 * | 12/2013 | Baccouche | B60K 1/04 180/68.5 |
| 8,608,230 | B2 * | 12/2013 | Young | B60K 1/04 296/187.02 |
| 8,689,919 | B2 * | 4/2014 | Maeda | B62D 21/157 180/311 |
| 8,708,402 | B2 * | 4/2014 | Saeki | B60K 1/04 180/68.5 |
| 8,839,895 | B2 * | 9/2014 | Kato | B60K 1/04 180/68.5 |
| 8,859,126 | B2 * | 10/2014 | Yamada | B60K 1/04 429/100 |
| 8,863,877 | B2 * | 10/2014 | Saeki | B60K 1/04 180/271 |
| 8,863,878 | B2 * | 10/2014 | Shirooka | B60K 1/04 180/68.5 |
| 8,932,769 | B2 * | 1/2015 | Ohashi | B62D 25/20 429/400 |
| 8,936,125 | B2 * | 1/2015 | Nakamori | B60K 1/04 180/68.5 |
| 8,939,246 | B2 * | 1/2015 | Yamaguchi | B60K 1/04 180/68.5 |
| 9,016,765 | B1 * | 4/2015 | Rawlinson | F41H 7/042 296/187.07 |
| 9,022,152 | B2 * | 5/2015 | Imamura | B62D 21/157 180/68.5 |
| 9,034,502 | B2 * | 5/2015 | Kano | B60K 1/04 429/99 |
| 9,056,631 | B2 * | 6/2015 | Nakamori | B60K 1/04 |
| 9,205,872 | B2 * | 12/2015 | Okada | B62D 25/20 |
| 9,281,505 | B2 * | 3/2016 | Hihara | B60K 1/04 |
| 9,283,838 | B2 * | 3/2016 | Ohashi | B60K 1/04 |
| 9,409,495 | B2 * | 8/2016 | Kobayashi | B60K 1/00 |
| 9,493,190 | B1 * | 11/2016 | Alwan | B62D 21/157 |
| 9,517,686 | B1 * | 12/2016 | Paramasivam | B60K 1/04 |
| 9,637,172 | B2 * | 5/2017 | Sagara | B62D 21/155 |
| 9,643,660 | B2 * | 5/2017 | Vollmer | B62D 25/2072 |
| 9,722,223 | B1 * | 8/2017 | Maguire | H01M 2/1083 |
| 9,812,746 | B2 * | 11/2017 | Katayama | B60K 1/04 |
| 9,853,262 | B2 * | 12/2017 | Subramanian | H01M 2/1083 |
| 9,873,456 | B2 * | 1/2018 | Hara | B60K 1/04 |
| 9,956,859 | B2 * | 5/2018 | Ikeda | B60K 1/04 |
| 9,975,416 | B2 * | 5/2018 | Hara | B62D 25/20 |
| 10,065,491 | B1 * | 9/2018 | Syed | B60L 50/66 |
| 10,069,123 | B2 * | 9/2018 | Maguire | H01M 2/1083 |
| 10,112,563 | B2 * | 10/2018 | Ashraf | B60R 19/34 |
| 10,245,955 | B2 * | 4/2019 | Nakayama | B60K 1/04 |
| 10,259,506 | B2 * | 4/2019 | Ayukawa | B62D 25/2036 |
| 10,272,759 | B2 * | 4/2019 | Sudhindra | B60K 1/04 |
| 10,272,949 | B2 * | 4/2019 | Faruque | B60K 1/04 |
| 10,279,693 | B2 * | 5/2019 | Shimizu | B62D 21/02 |
| 10,322,757 | B2 * | 6/2019 | Shimoda | B60K 1/04 |
| 10,336,211 | B2 * | 7/2019 | Kobayashi | B60K 1/04 |
| 10,358,048 | B2 * | 7/2019 | Hara | H01M 2/1077 |
| 10,358,168 | B2 * | 7/2019 | Atsumi | B62D 21/157 |
| 2009/0166116 | A1 * | 7/2009 | Kiya | B60K 1/04 180/68.5 |
| 2010/0101885 | A1 * | 4/2010 | Nozaki | B60K 1/00 180/232 |
| 2015/0197144 | A1 * | 7/2015 | Jarocki | B60K 1/04 180/232 |

\* cited by examiner

VEHICLE REAR STRUCTURE

CROSS REFERENCE TO RELATED APPLICATION

This application claims priority to Japanese Patent Application No. 2018-042752 filed on Mar. 9, 2018, which is incorporated herein by reference in its entirety including the specification, claims, drawings, and abstract.

TECHNICAL FIELD

The present disclosure relates to a vehicle rear structure, and more particularly to a vehicle rear structure for securing a battery pack to rear side members by suspension.

BACKGROUND

Motor vehicles such as electric vehicles or hybrid vehicles have been widely used in recent years. Motor vehicles require that a battery with a large capacity be mounted thereon, because a battery with a larger capacity provides a longer cruising range. It is therefore proposed to mount a battery pack that stores a plurality of battery modules under the floor of an automobile. JP 2011-121483 A, for example, proposes a structure in which a battery pack including battery frames extending in the vehicle forward-rearward direction is mounted under a floor panel such that portions of the battery frames on the vehicle rear end side are fastened, via a floor cross member, to rear side members.

SUMMARY

Technical Problem

To provide a battery pack with a larger capacity, it has been considered to mount a large size battery pack extending to the portion of the floor cross member close to the vehicle rearward side under the floor panel. In this structure, the rear end of the battery pack is secured to the rear side members by suspension.

The rear side member is a reinforcement having a front end portion fastened to the outside of the floor cross member in the vehicle width direction and extending, from the floor cross member, rearward and diagonally upward of the vehicle and then extending further rearward horizontally. The rear side member therefore has the front end portion connected to the floor cross member and the rear end portion at different heights. When a rear crash of the vehicle causes a collision force toward the front portion of the vehicle to be exerted on the rear end portion of the rear side member, a counterclockwise bending moment as seen from the left side of the vehicle acts on the front end portion of the rear side member due to a difference in height between the front and rear end portions. This bending moment causes the rear end portion of the rear side member to be raised upward in a side view, which may cause bending and deformation of the front end portion connected to the floor cross member. This may further cause damage to the battery pack which is secured to the front end portions of the rear side members by suspension.

Embodiments of the disclosure are directed toward reducing damage to a battery pack upon application of a collision load from rearward of the vehicle in a vehicle rear structure in which the battery pack is secured to rear side members by suspension.

Solution to Problem

In accordance with an aspect of the disclosure, a vehicle rear structure includes rear side members configured to secure a battery pack by suspension. The rear side members each include a less-strengthened portion disposed further rearward of a vehicle with respect to a suspending portion on the rear side member. The suspending portion is configured to secure a rear end of the battery pack by suspension. The less-strengthened portion causes the rear side member to bend and deform when a collision load is applied from rearward of the vehicle to the rear side member.

As the less-strengthened portion is disposed further rearward of the vehicle with respect to the suspending portion that secures the rear end portion of the battery pack by suspension, upon receiving a collision load from the rearward of the vehicle, the rear side member bends and deforms in a portion further rearward of the vehicle with respect to the suspending portion. This structure, as compared to the structure without the less-strengthened portion, reduces the amount of deformation of the portion of the rear side member located further forward of the vehicle with respect to the suspending portion, which further reduces the amount of deformation of the battery pack mounted to this portion. This results in a reduction of damage to the battery pack when a collision load from the rearward of the vehicle is applied.

In the vehicle rear structure, the less-strengthened portion may be disposed in a center portion between the suspending portion of the rear side member and a rear end portion of the rear side member.

The portion of the rear side member further forward of the vehicle with respect to the suspending portion has a high bending strength. As the collision load is applied to the rear end portion of the rear side member, the center portion between the suspending portion and the rear end of the rear side member bends and deforms easily. The less-strengthened portion disposed in this center portion, which deforms and bends easily, efficiently generates bending deformation in the portion of the rear side member further rearward of the vehicle with respect of the suspending portion, when the collision load is applied from rearward of the vehicle.

In the vehicle rear structure, the less-strengthened portion may be disposed on the rear side member between a front fastener and a rear fastener configured to fasten a rear suspension member.

The portion of the rear side member between the front fastener and the rear fastener for the rear suspension member corresponds to the center portion between the suspending portion of the rear side member and the rear end of the rear side member. In this portion, no other members are fastened, and therefore the less-strengthened portion can be formed easily. This enables formation of the less-strengthened portion with a simple structure.

In the vehicle rear structure, the less-strengthened portion may include a notch or a bead in the rear side member.

The simple structure of the less-strengthened portion as described above reduces damage to the battery pack in a simple manner when the collision load is applied from rearward of the vehicle.

Advantageous Effects of Invention

Embodiments of the disclosure reduce damage to a battery pack upon application of a collision load from rearward of the vehicle in a vehicle rear structure in which the battery pack is secured to the rear side members by suspension.

BRIEF DESCRIPTION OF DRAWINGS

Embodiments of the present disclosure will be described by reference to the following figures, wherein.

DESCRIPTION OF EMBODIMENTS

Vehicle Body Structure

Figure 1:
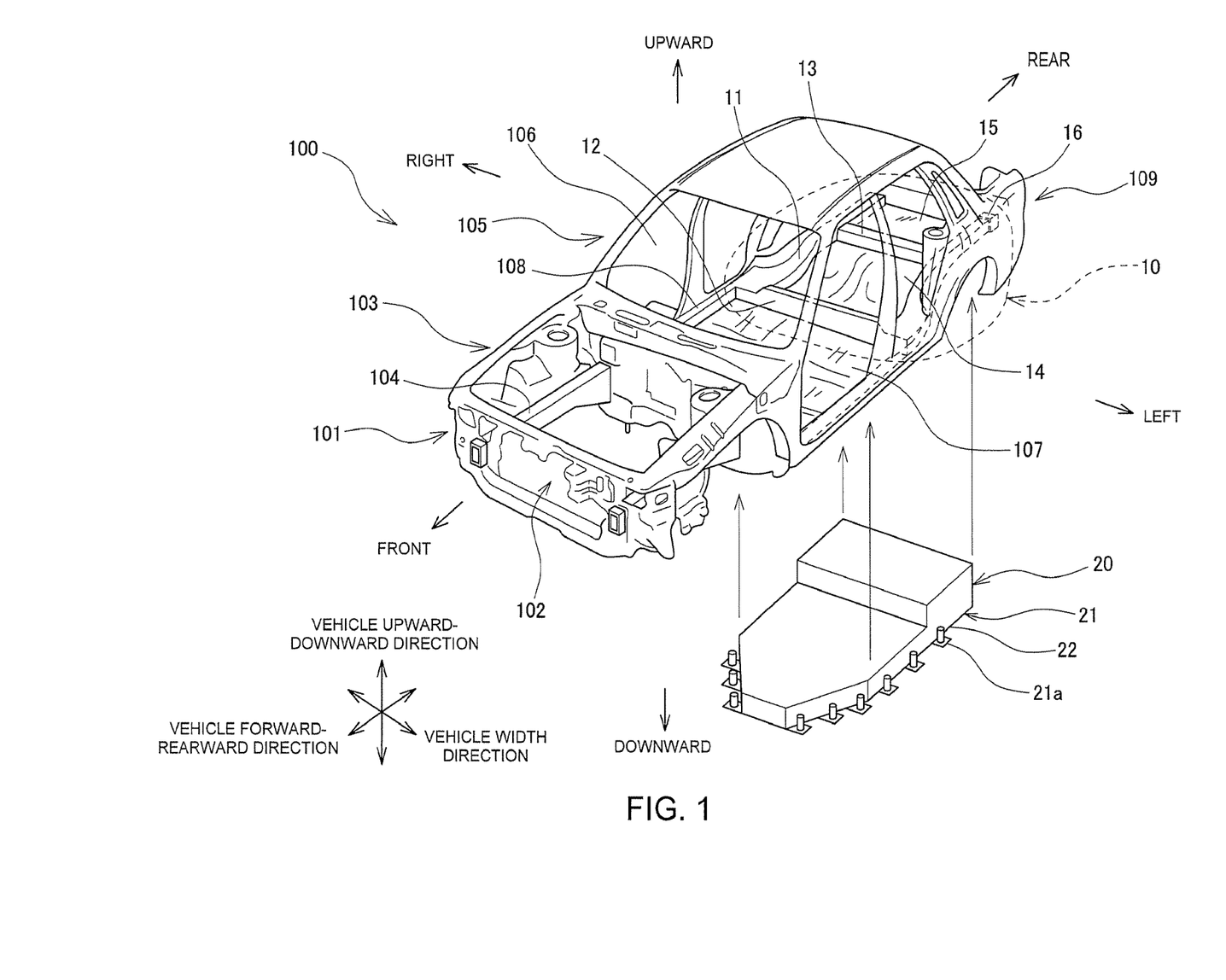
FIG. 1 is a perspective view illustrating a body of a vehicle including a vehicle rear structure according to an embodiment.

A vehicle rear structure 10 according to an embodiment will be described by reference to the drawings. Referring first to FIG. 1, the structure of a body 101 of a vehicle 100 having the vehicle rear structure 10 will be described. The vehicle 100 is a sedan electric vehicle including a motor as a drive source.

As illustrated in FIG. 1, the body 101 includes a vehicle front portion 103 including a power compartment 102 in which a motor and a power control unit are mounted, a vehicle cabin section 105, and a vehicle rear portion 109 including a trunk room and a vehicle rear structure 10. The vehicle front portion 103 includes, on the respective sides in the vehicle width direction, front side members 104 extending in the vehicle forward-rearward direction. The motor and the like are mounted on the front side member 104. The vehicle cabin section 105 includes lockers 108 disposed on the respective sides in the vehicle width direction and extending in the vehicle forward-rearward direction, and a floor panel 107 forming a floor of a vehicle cabin 106.

The vehicle rear structure 10 includes a floor cross member 12, a rear cross member 13, rear side members 11, a floor panel 14, a rear floor panel 15, and crush boxes 16. The floor panel 107 of the vehicle cabin section 105 and the floor panel 14 of the vehicle rear structure 10 together form a floor of the vehicle cabin 106. The rear floor panel 15 of the vehicle rear structure 10 forms a floor of the trunk room. A battery pack 20 is mounted under the floor panels 107 and 14.

Vehicle Rear Structure

Figure 2:
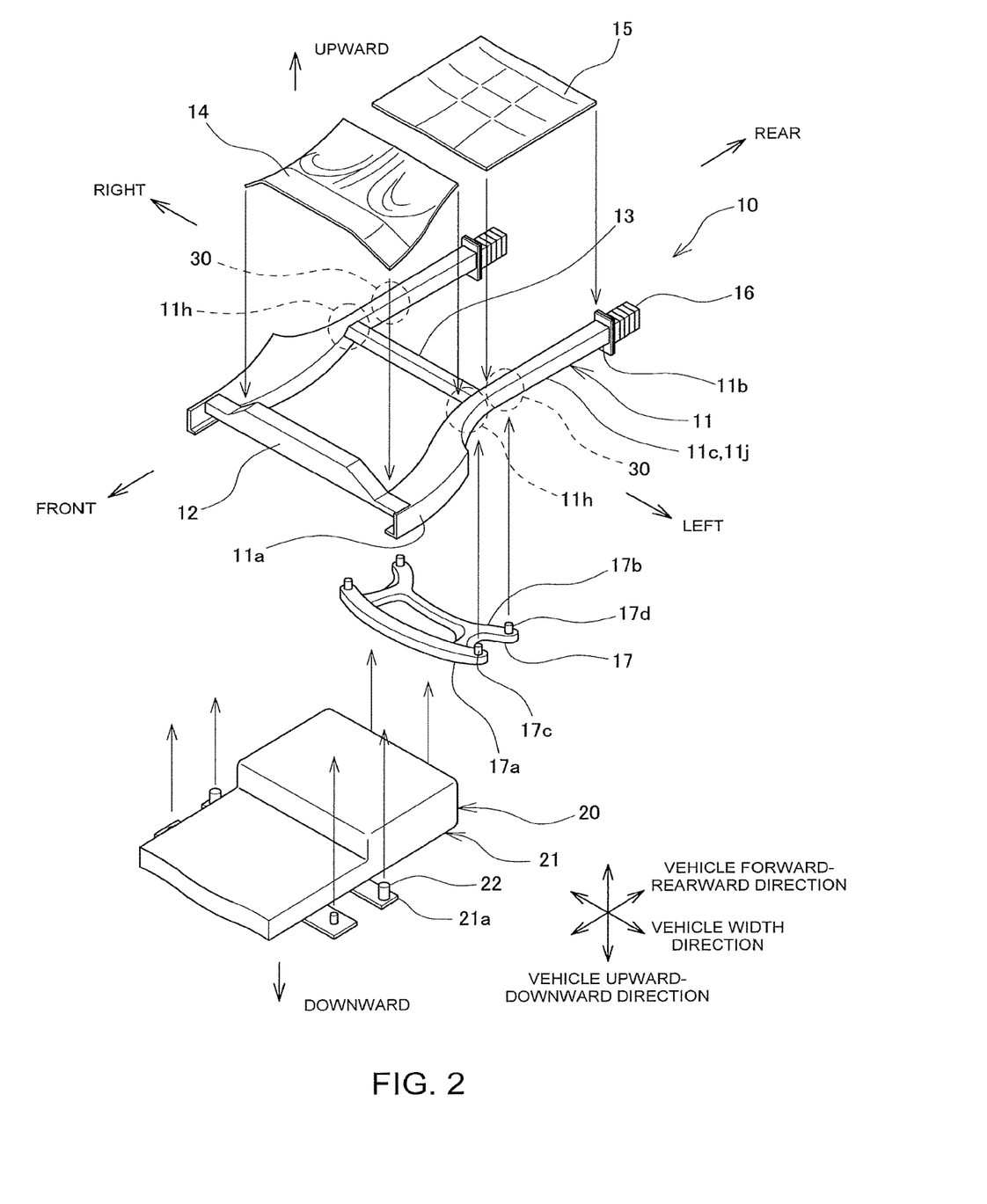
FIG. 2 is an exploded perspective view of the vehicle rear structure according to the embodiment.
Figure 3:
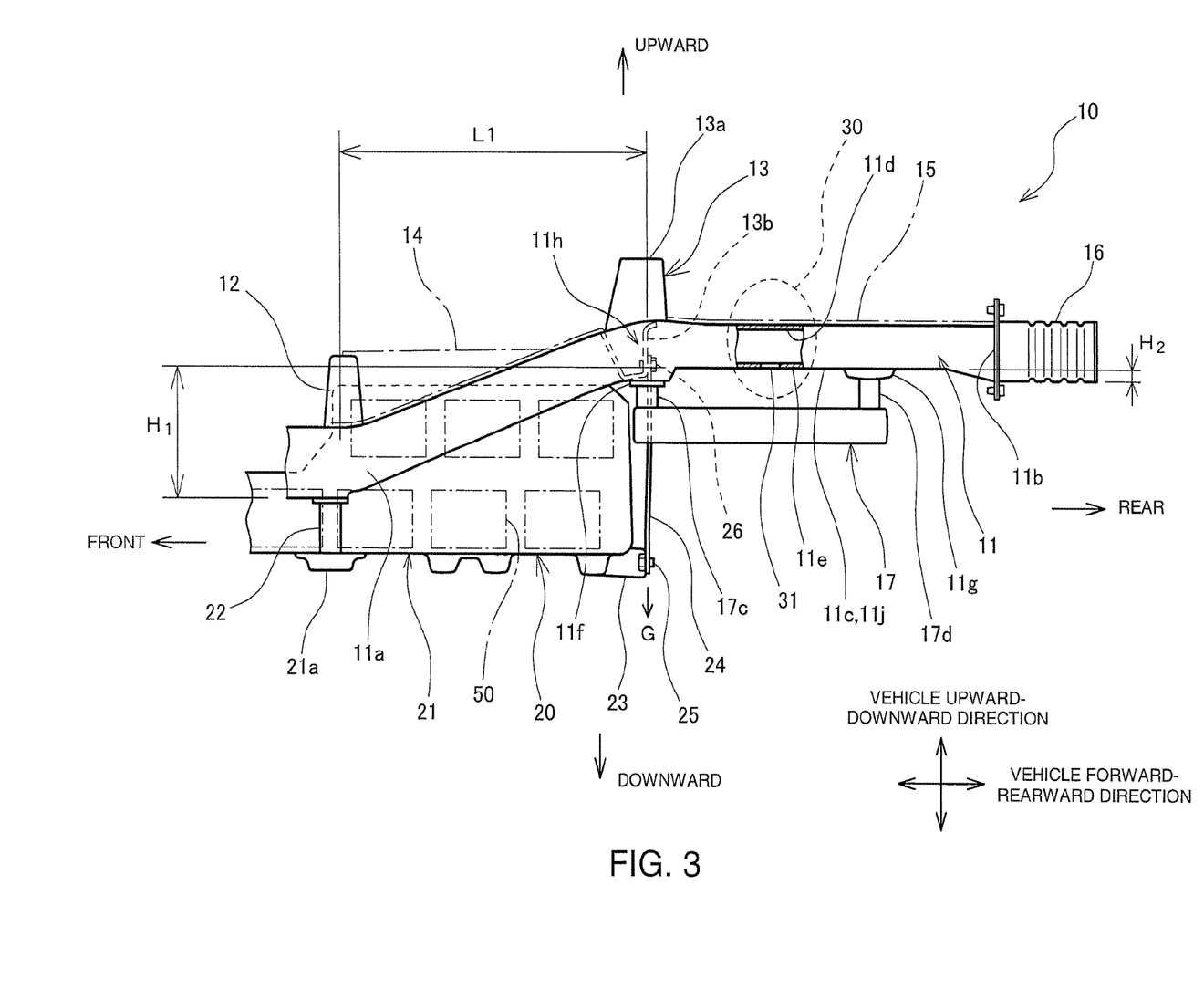
FIG. 3 is a side view of the vehicle rear structure according to the embodiment.
Figure 4:
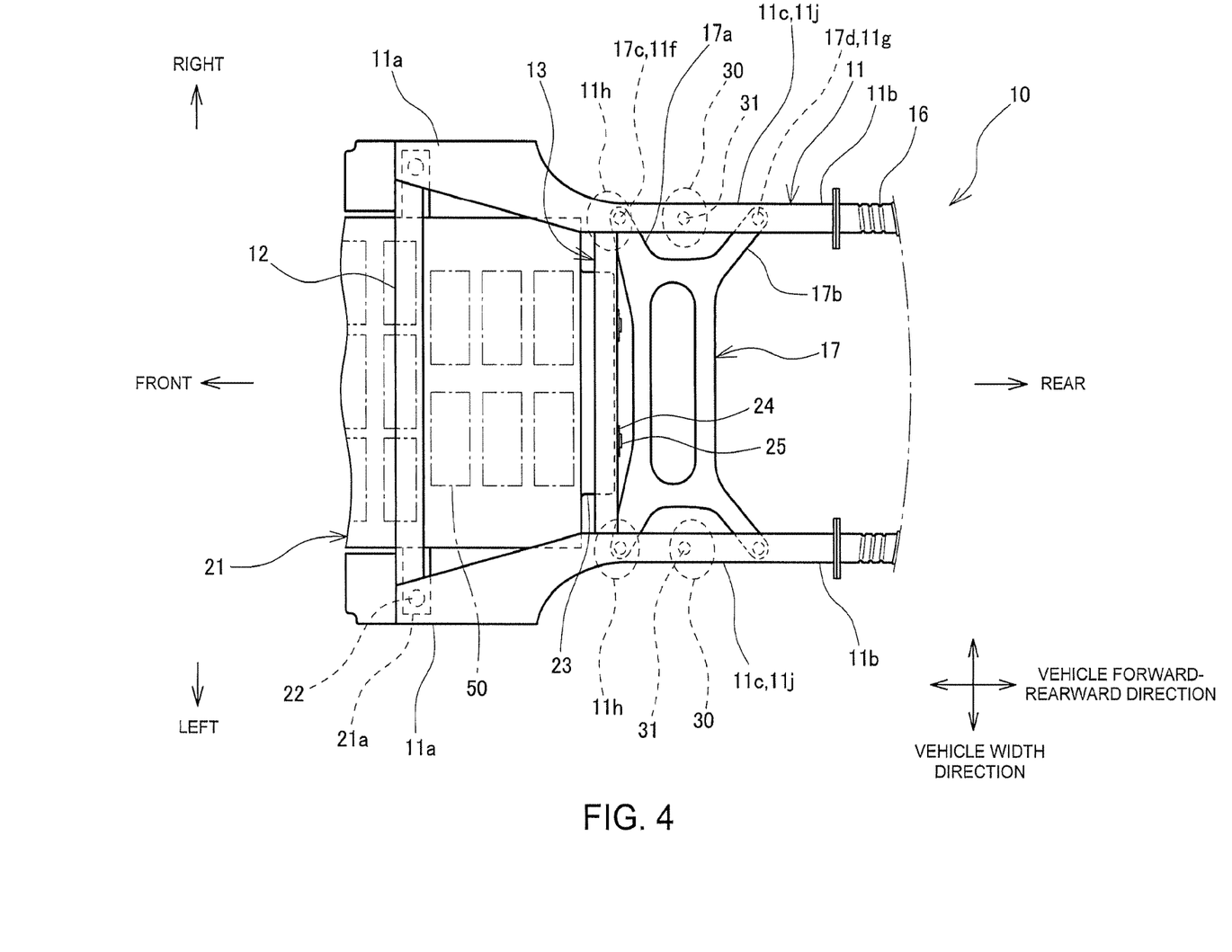
FIG. 4 is a plan view of the vehicle rear structure according to the embodiment.

Referring now to FIG. 2 to FIG. 4, the vehicle rear structure 10 will be described in detail. As illustrated in FIG. 2, the vehicle rear structure 10 includes the floor cross member 12, the rear cross member 13, a pair of the rear side members 11, the floor panel 14, the rear floor panel 15, the crush boxes 16, and a rear suspension member 17. Each rear side member 11 includes a less-strengthened portion 30 in a portion further rearward of the vehicle with respect to a coupling portion 11h with the rear cross member 13.

The floor cross member 12 is a reinforcement extending in the vehicle width direction near the center of rear doors in the vehicle forward-rearward direction, as illustrated in FIG. 1. As illustrated in FIG. 3, the floor cross member 12 has a hat-shape cross section having a top surface on which the floor panel 14 is mounted.

As illustrated in FIG. 3 and FIG. 4, the right and left rear side members 11 are reinforcements having a closed section structure, each including a front end portion 11a fastened to the outside of the floor cross member 12 in the vehicle width direction. Each rear side member 11 extends from the floor cross member 12 toward the rearward and diagonally upward of the vehicle and then extends further rearward of the vehicle horizontally. As illustrated in FIG. 3, the lower face of the front end portion 11a of the rear side member 11 is displaced from the lower face of a horizontal portion 11c horizontally extending rearward of the vehicle, by a height H1 in the vehicle upward-downward direction. As illustrated in FIG. 4, the right and left rear side members 11 are symmetrical with each other. The crush boxes 16 are mounted on rear end portions 11b of the respective rear side members 11. The crush box 16 has a lower face which is located lower than the lower face of the horizontal portion 11c of the rear side member 11 in the vehicle upward-downward direction, by a height H2. The rear end portion 11b of the rear side member 11 expands downward in a trapezoidal shape from the horizontal portion 11c toward the crush box 16. The floor panel 14 and the rear floor panel 15 are coupled to upper faces of the rear side members 11.

Figure 5:
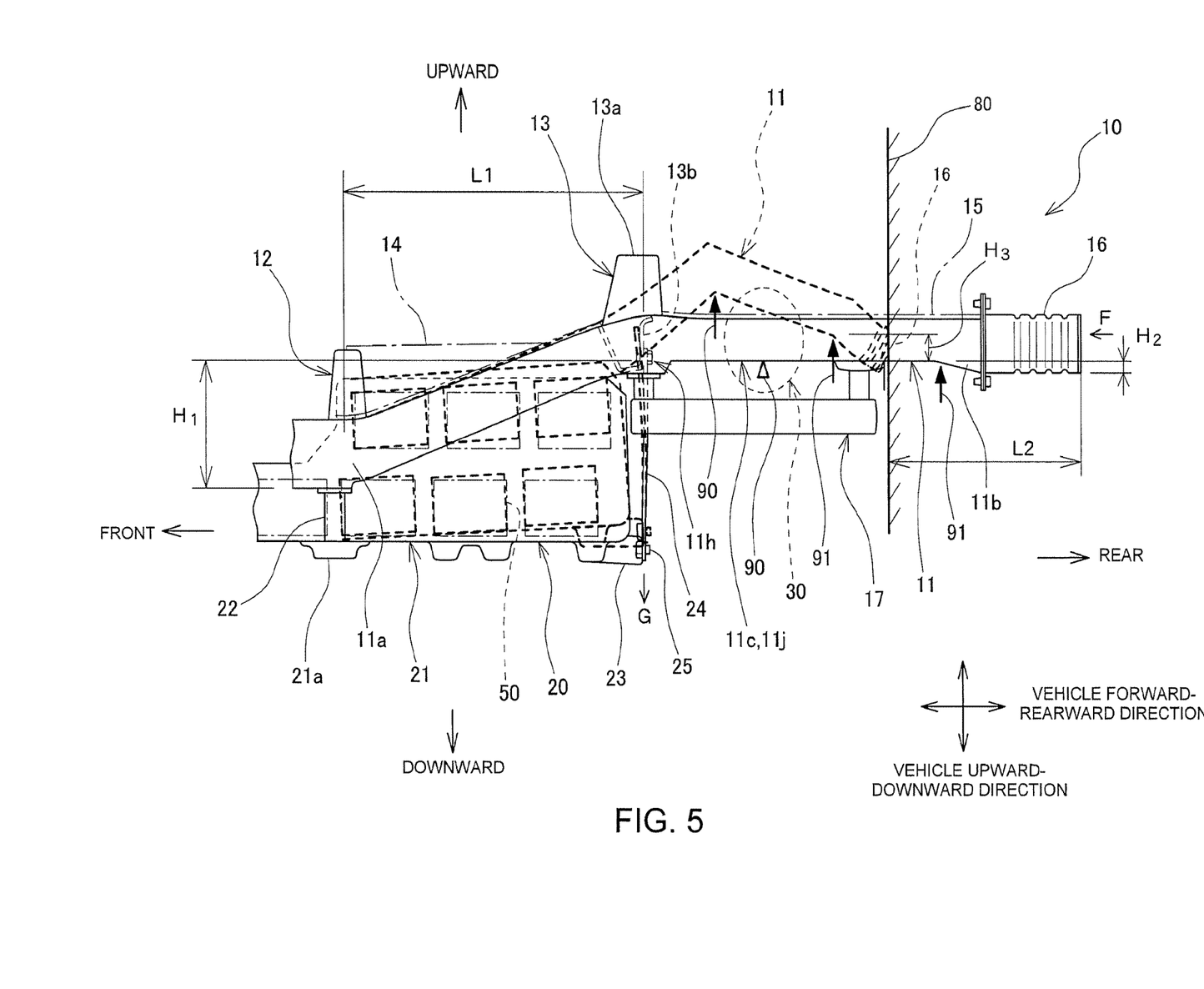
FIG. 5 is a side view illustrating deformation caused when a collision load is applied to the vehicle rear structure according to the embodiment.

The rear cross member 13 is a reinforcement coupling the right and left rear side members 11 together in the vehicle width direction. The rear cross member 13 is disposed in locations of the rear side members 11 where the extending direction of the rear side members 11 change from the rearward and diagonally upward direction of the vehicle to the horizontal direction, or in locations on the rear side member 11 distant from the front end portion 11a toward the rearward of the vehicle by a distance L1. As illustrated in FIG. 5, the rear cross member 13 has a closed section structure including a combination of an upper member 13a having an upwardly projecting hat-shape cross section and a lower member 13b having a downwardly projecting concave cross section. The upper member 13a has a side facing forward of the vehicle, which is connected with the floor panel 14, and also has a side facing rearward of the vehicle, which is connected with the rear floor panel 15.

The rear suspension member 17 is attached to lower portions of the horizontal portions 11c of the rear side members 11 located further rearward of the vehicle with respect to the rear cross member 13. As illustrated in FIG. 4, the rear suspension member 17 is a rectangular annular member in a top view, and includes a pair of forward arms 17a and a pair of rearward arms 17b each protruding outward in the vehicle width direction. The forward arms 17a and the rearward arms 17b include, on their top surfaces, posts 17c and 17d, respectively. The posts 17c of the forward arms 17a are respectively fastened to front fasteners 11f disposed toward the frontward of the vehicle on the horizontal portions 11c of the rear side member 11. The posts 17d of the rearward arms 17b are respectively fastened to rear fasteners 11g disposed toward the rearward of the vehicle on the horizontal portions 11c of the rear side member 11.

As illustrated in FIG. 3 and FIG. 4, the battery pack 20 stores a plurality of battery modules 50 in a single casing 21. The casing 21 stores the battery modules 50 in two levels in the upward-downward direction and in two rows in the right-left direction in an area further rearward of the vehicle with respect to the floor cross member 12, and stores the battery modules 50 in one level in the upward-downward direction and in three rows in the right-left direction in an area further frontward of the vehicle with respect to the floor cross member 12. The battery pack 20 includes the casing 21, a plurality of cross frames 21*a* disposed under the casing 21, and posts 22 attached to the cross frames 21*a*. The battery pack 20 further includes, toward the vehicle rear end, a rear end attaching bracket 23 protruding rearward of the vehicle from the casing 21. The posts 22 of the battery pack 20 are fastened to lower surfaces of front end portions 11*a* of the rear side members 11, respectively. The rear end attaching bracket 23 of the battery pack 20 is fastened to a lower end of a suspending bar 24 via a bolt 25. An upper end of the suspending bar 24 is fastened to a lower member 13*b* of the rear cross member 13 with a bolt 26. The posts 22 disposed further frontward with respect to the floor cross member 12 are fastened to the lower surface of the locker 108 of the body 101, as illustrated in FIG. 1.

The rear cross member 13 is a reinforcement that couples the left and right rear side members 11 in the vehicle width direction, and a portion of the battery pack 20 close to the vehicle rear end is secured to the rear side members 11 via the rear end attaching brackets 23, the suspending bars 24, and the rear cross member 13 by suspension. Further, the posts 22 are fastened to the undersides of the front end portions 11*a* of the rear side members 11, respectively. Therefore, the battery pack 20 is secured to the rear side members 11 by suspension, and the coupling portion 11*h* of the rear side member 11 coupling with the rear cross member 13 forms a suspending portion for securing the rear end portion of the battery pack 20 by suspension. A suspending load G of the rear end portion of the battery pack 20 is applied downward to the coupling portion 11*b*. The battery pack 20 is mounted under the floor panels 14 and 107.

As illustrated in FIG. 3 and FIG. 4, the rear side member 11 includes the less-strengthened portion 30 at a portion further rearward of the vehicle with respect to the coupling portion 11*h* between the front fastener 11*f* fastened to the post 17*c* of the forward arm 17*a* of the rear suspension member 17 and the rear fastener 11*g* fastened to the post 17*d* of the rearward arm 17*b*. More specifically, the less-strengthened portion 30 is disposed at a center portion 11*j* which bends and deforms easily between the coupling portion 11*h* and the rear end portion of the rear side member 11, and also between the front fastener 11*f* and the rear fastener 11*g* for the rear suspension member 17.

As illustrated in FIG. 3, the rear side member 11 is a rectangular tubular longitudinal member having a closed section structure and includes the less-strengthened portion 30 having a hole 31, which is a notch, in an under plate 11*e* to have a reduced bending strength. The portion of the rear side member 11 between the front fastener 11*f* and the rear fastener 11*g* for the rear suspension member 17, to which no members are fastened, is appropriate for forming the less-strengthened portion 30. This makes it possible to form the less-strengthened portion 30 simply by providing the hole 31 which is a notch in the under plate 11*e*.

Deformation of Each Part in Rear Crash

Referring to FIG. 5, deformation of each part of the vehicle rear structure 10 configured as described above, which is caused by application of a collision load F from rearward when a barrier 80 crashes against the rear portion of the vehicle, will be described. In FIG. 5, dashed lines indicate deformation caused by application of the collision load F to the vehicle rear structure 10 according to the embodiment.

As illustrated in FIG. 5, application of the collision load F to the rear end of the crush box 16 causes the crush box 16 to be collapsed in the vehicle forward-rearward direction. The collision load F is thereafter transmitted from the crush box 16 to the rear end portion 11*b* of the rear side member 11. The underside face of the crush box 16 is located below the underside face of the horizontal portion 11*c* of the rear side member 11 in the vehicle upward-downward direction by the height H2. Therefore, transmission of the collision load F to the rear end portion 11*b* of the rear side member 11 further causes a clockwise bending moment, F×H2, as seen from the left side of the vehicle, to be applied to the rear end portion 11*b* of the rear side member 11. This bending moment deforms the rear end portion 11*b* of the rear side member 11 by bending it downward in a side view at a boundary portion 91 between the horizontal portion 11*c* and the rear end portion 11*b* of the rear side member 11.

The downward bending deformation of the rear end portion 11*b* of the rear side member 11 at the boundary portion 91 increases the difference in height between the underside of the horizontal portion 11*c* of the rear side member 11 and the lower end of the collapsed crush box 16 from the initial height H2 to a height H3. This causes a clockwise bending moment, which is greater than the initial bending moment at the start of a crash, to be applied to the horizontal portion 11*c* of rear side member 11.

The underside face of the front end portion 11*a* of the rear side member 11 is displaced downward in the vehicle upward-downward direction from the underside face of the horizontal portion 11*c* extending horizontally by the height H1. Therefore, application of the collision load F to the rear side member 11 causes a counterclockwise bending moment, F×H1, as seen from the left side of the vehicle, to be applied to the front end portion 11*a* of the rear side member 11. Simultaneously, the rear side member 11 also receives the suspending load G of the vehicle rear end of the battery pack 20, which causes a clockwise bending moment, G×L1, as seen from the left side of the vehicle, to be applied to the front end portion 11*a* of the rear side member 11. Consequently, the front end portion 11*a* of the rear side member 11 receives a counterclockwise bending moment, (F×H1−G×L1), as seen from the left side of the vehicle.

The rear side member 11 has a high bending strength in a portion further forward of the vehicle with respect to the coupling portion 11*h*, whereas the center portion 11*j* between the coupling portion 11*h* and the rear end portion 11*b* of the rear side member 11 bends and deforms easily. The center portion 11*j*, which bends and deforms easily, includes the less-strengthened portion 30. Therefore, application of a clockwise bending moment larger than the bending moment at the start of a crash to the horizontal portion 11*c* of the rear side member 11 causes the position 90 (indicated by an arrow in FIG. 5) of the rear side member 11 having the hole 31 of the less-strengthened portion 30 to be first bent and deform downward in a side view before the front end portion 11*a* bends and deforms. This bending deformation further absorbs a collision energy.

Further, the counterclockwise bending moment, (F×H1−G×L1), as seen from the left side of the vehicle causes the portion of the rear side member 11 further forward from the less-strengthened portion 30 to lift upward in a side view and deform.

As described above, application of the collision load F to the vehicle rear structure 10 by a rear crash of the vehicle with the barrier 80 causes the portion of the rear side member 11 between the front end portion 11*a* and the less-strengthened portion 30 to deform by being raised upward in a side view and causes the less-strengthened portion 30 to deform by bending downward in a side view at the position 90 including the hole 31, as indicated by the dashed line in FIG. 5. The rear end portion 11b of the rear side member 11 further bends downward in a side view in the boundary portion 91 between the rear end portion 11b and the horizontal portion 11c. Consequently, the barrier 80 enters the vehicle 100 by an entering distance L2, which is shorter than an entering distance L3 of the related art vehicle rear structure 110 when the collision load F is applied, as will be described below.

Deformation of Related Art Vehicle Rear Structure in Rear Crash

Figure 6:
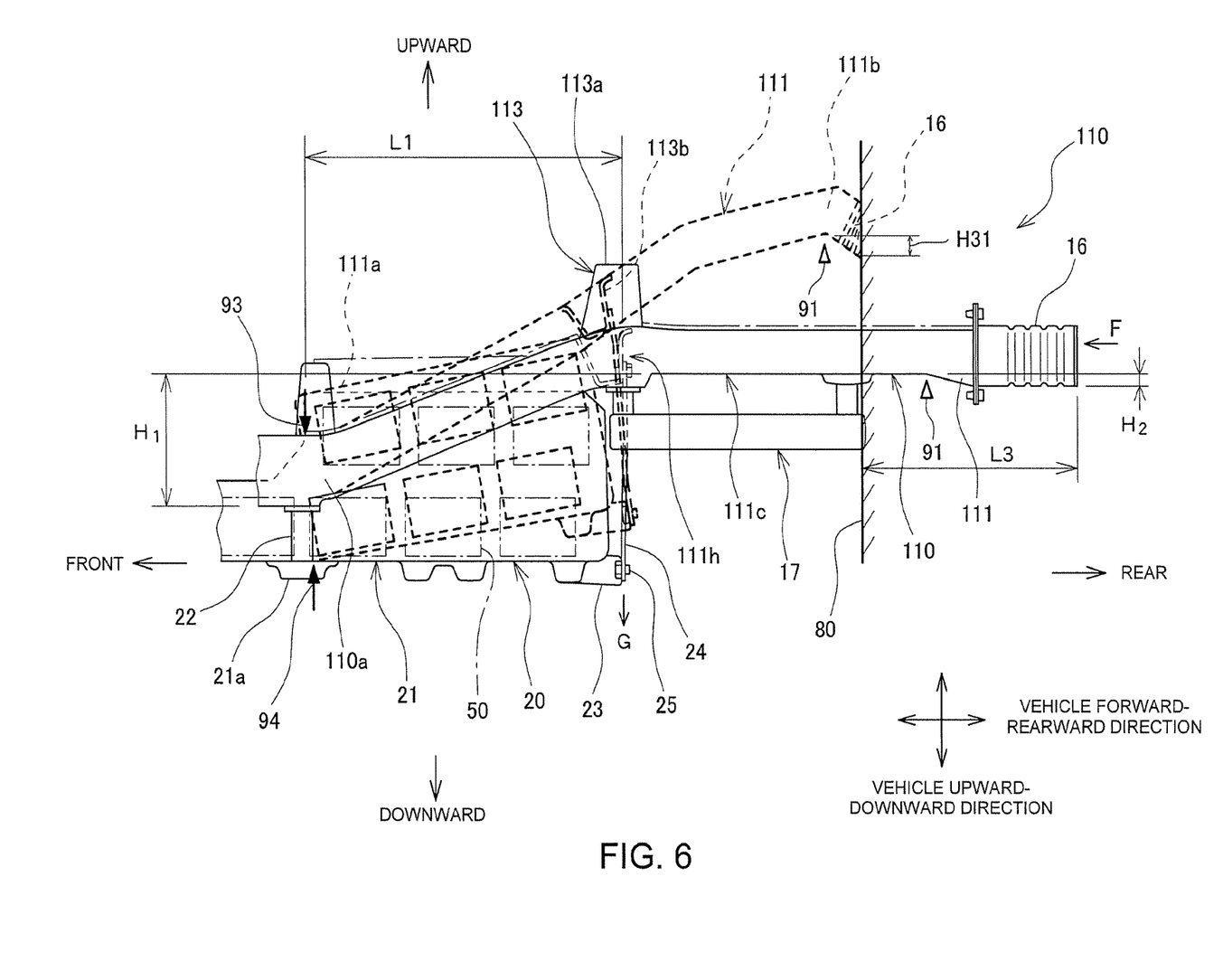
FIG. 6 is a side view illustrating deformation caused when a collision load is applied to a vehicle rear structure of the related art.

Referring now to FIG. 6, deformation of a related art vehicle rear structure 110 that does not include the less-strengthened portion 30, caused by application of the collision load F, will be described. FIG. 6 indicates, with dashed lines, deformation of the related art vehicle rear structure 110 caused by application of the collision load F. The related art vehicle rear structure 110 is similar to the vehicle rear structure 10 according to the present embodiment except that the rear side member 111 does not include the less-strengthened portion 30; therefore, similar elements are denoted with similar numerical references and will not be described.

As illustrated in FIG. 6, application of the collision load F to the related art vehicle rear structure 110 causes, similar to the vehicle rear structure 10 of the embodiment, a rear end portion 111b to bend downward in a side view at the boundary portion 91 and deform between a horizontal portion 111c and the rear end portion 111b. This bending deformation increase a difference in height between the underside face of the horizontal portion 111c of the rear side member 111 and the lower end of the collapsed crush box 16 from the initial height H2 to a height H31. This results in application of a clockwise bending moment which is larger than the bending moment at the start of a crash to the horizontal portion 111c of the rear side member 111.

In the related art vehicle rear structure 110, which does not include the less-strengthened portion 30 in the rear side member 111, the rear side member 111 deforms so as to be raised greatly upward in a side view about the front end portion 111a by application of the counterclockwise bending moment, (F×H1−G×L1), as seen from the left side of the vehicle, to the rear side member 111, rather than being bent downward at the horizontal portion 111c. This counterclockwise bending moment further causes the rear side member 111 to deform by bending upward at a position 93 in the front end portion 111a (indicated by an arrow in FIG. 6), thereby greatly lifting the rear cross member 113 securing the rear end of the battery pack 20 by suspension. Consequently, the casing 21 of the battery pack 20 deforms by being greatly bent upward at a position 94 (indicated by an arrow in FIG. 6) corresponding to the position 93 in the front end portion 111a of the rear side member 111. This deformation of the casing 21 may cause damage to the battery modules 50 stored in the casing 21 by bringing the battery modules 50 into contact with each other and deforming them. Further, the barrier 80 enters the vehicle 100 by an entering distance L3 which is greater than the entering distance L2 in the vehicle rear structure 10 in the embodiment described above.

Effects and Advantages of Vehicle Rear Structure of Embodiment

In contrast, in the vehicle rear structure 10 of the present embodiment, the rear side member 11, receiving the collision load F applied from rearward, deforms by bending downward at the boundary portion 91 having the less-strengthened portion 30, thereby absorbing the collision energy. This structure reduces an amount of upward deformation of the portion of the rear side member 11 located further frontward with respect to the less-strengthened portion 30. The structure therefore further reduces an amount of upward deformation of the coupling portion 11h with the rear cross member 13, which is a suspending securing portion disposed further forward with respect to the less-strengthened portion 30, and an amount of upward deformation of the portion of the rear side member 11 located further forward of the vehicle with respect to the coupling portion 11h. This further results in a reduction of upward deformation of the casing 21 of the battery pack 20 which is suspended from and secured to the rear side member 11.

As described above, the vehicle rear structure 10 according to the present embodiment, as compared to the related art vehicle rear structure 110 without the less-strengthened portion 30, reduces the amount of deformation of the portion of the rear side member 11 located further forward of the vehicle with respect to the coupling portion 11h of the rear side member 11 and further reduces the amount of deformation of the battery pack 20 mounted to this portion. This structure therefore reduces damage to the battery pack 20 when the collision load F is applied from rearward of the vehicle.

In the vehicle rear structure 10, as the less-strengthened portion 30, which is deformed by bending, absorbs the collision energy, the entering distance of the barrier 80 in a rear crash is shorter than that in the related art vehicle rear structure 110 without the less-strengthened portion 30.

OTHER EMBODIMENTS

In the above embodiment, the less-strengthened portion 30 is disposed on the rear side member further rearward of the vehicle with respect to the coupling portion 11h between the front fastener 11f and the rear fastener 11g for the rear suspension member 17. The less-strengthened portion 30, when disposed further rearward of the vehicle with respect to the coupling portion 11h of the rear side member 11, is bent and deformed to reduce the amount of upward deformation of the rear cross member 13 disposed further forward of the vehicle with respect to the coupling portion 11h. Therefore, the less-strengthened portion 30 should be disposed further rearward of the vehicle with respect to the coupling portion 11h of the rear side member 11, but need not be disposed between the front fastener 11f and the rear fastener 11g.

Further, while in the above embodiment, the less-strengthened portion 30 includes the under plate 11e of the rear side member 11 having the hole 31, the structure of the less-strengthened portion 30 is not limited to this example. For example, the less-strengthened portion 30 may include a bead extending in the width direction, which reduces the bending strength, on the under plate 11e and the top plate 11d of the rear side member 11. This bead may be of a corrugated bent structure extending in the width direction of the under plate 11e and the top plate 11d, or may be a recess extending in the width direction. Alternatively, portions of the horizontal portion 11c located forward and backward of the less-strengthened portion 30 may have an increased thickness, so that the less-strengthened portion 30 has a bending strength lower than that of the surrounding members.

The invention claimed is:

1. A vehicle rear structure comprising:
rear side members configured to secure a battery pack by suspension, the rear side members each including a rear end portion, a horizontal portion horizontally extending rearward in a vehicle from a suspending portion toward the rear end portion, and a less-strengthened portion disposed in the horizontal portion, the suspending portion is on the rear side member and configured to secure a rear end of the battery pack by suspension, wherein the less-strengthened portion causes the rear side member to bend and deform when a collision load is applied from rearward of the vehicle to the rear side member, and when the collision load is applied from rearward of the vehicle to the rear side member, the rear side member deforms such that the less-strengthened portion is located further upward in the vehicle than the suspending portion and the rear end portion of the rear side member.

2. The vehicle rear structure according to claim 1, wherein the less-strengthened portion is disposed in a center portion between the suspending portion of the rear side member and the rear end portion of the rear side member.

3. The vehicle rear structure according to claim 2, wherein the less-strengthened portion is disposed on the rear side member between a front fastener and a rear fastener configured to fasten a rear suspension member.

4. A vehicle rear structure comprising:

rear side members configured to secure a battery pack by suspension, the rear side members each including a rear end portion, a horizontal portion horizontal) extending rearward in a vehicle from a suspending portion toward the rear end portion, and a less-strengthened portion disposed in the horizontal portion, the suspending portion is on the rear side member and configured to secure a rear end of the battery pack by suspension, wherein the less-strengthened portion causes the rear side member to bend and deform when a collision load is applied from rearward of the vehicle to the rear side member, when the collision load is applied from rearward of the vehicle to the rear side member, the rear side member retains the rear end of the battery pack secured by suspension.

5. The vehicle rear structure according to claim 4, wherein the less-strengthened portion is disposed in a center portion between the suspending portion of the rear side member and a rear end portion of the rear side member.

6. The vehicle rear structure according to claim 5, wherein the less-strengthened portion is disposed on the rear side member between a front fastener and a rear fastener configured to fasten a rear suspension member.

7. A vehicle rear structure comprising:

rear side members configured to secure a battery pack by suspension, the rear side members each including a rear end portion, a horizontal portion horizontally extending rearward in a vehicle from a suspending portion toward the rear end portion, and a less-strengthened portion disposed in the horizontal portion, the suspending portion being configured to secure a rear end of the battery pack by suspension, wherein the less-strengthened portion causes the rear side member to bend and deform when a collision load is applied from rearward of the vehicle to the rear side member, and the less-strengthened portion includes a notch or a bead in the rear side member.

8. The vehicle rear structure according to claim 7, wherein the less-strengthened portion is disposed in a center portion between the suspending portion of the rear side member and a rear end portion of the rear side member.

9. The vehicle rear structure according to claim 8, wherein the less-strengthened portion is disposed on the rear side member between a front fastener and a rear fastener configured to fasten a rear suspension member.

* * * * *